(12) United States Patent
Chen

(10) Patent No.: US 11,385,059 B2
(45) Date of Patent: Jul. 12, 2022

(54) METHOD FOR DETERMINING HEADING OF UNMANNED AERIAL VEHICLE AND UNMANNED AERIAL VEHICLE

(71) Applicant: GUANGZHOU XAIRCRAFT TECHNOLOGY CO., LTD, Guangdong (CN)

(72) Inventor: Yousheng Chen, Guangdong (CN)

(73) Assignee: GUANGZHOU XAIRCRAFT TECHNOLOGY CO., LTD, Guangdong (CN)

( * ) Notice: Subject to any disclaimer, the term of this patent is extended or adjusted under 35 U.S.C. 154(b) by 128 days.

(21) Appl. No.: 16/480,641

(22) PCT Filed: May 26, 2017

(86) PCT No.: PCT/CN2017/086196
§ 371 (c)(1),
(2) Date: Jul. 24, 2019

(87) PCT Pub. No.: WO2018/214166
PCT Pub. Date: Nov. 29, 2018

(65) Prior Publication Data
US 2020/0011670 A1    Jan. 9, 2020

(51) Int. Cl.
*G01C 21/16* (2006.01)
*B64C 39/02* (2006.01)
(Continued)

(52) U.S. Cl.
CPC ............ *G01C 21/165* (2013.01); *B64C 39/02* (2013.01); *B64D 47/08* (2013.01); *B64C 2201/145* (2013.01)

(58) Field of Classification Search
USPC ........................................................ 701/468
See application file for complete search history.

(56) References Cited

U.S. PATENT DOCUMENTS 3,070,938 A    1/1963   Winget
7,295,943 B2   11/2007  Cho et al.
(Continued)

FOREIGN PATENT DOCUMENTS

CN    104503466 A    4/2015
CN    104535065 A    4/2015
(Continued)

OTHER PUBLICATIONS

ISA, International Search Report, dated Feb. 24, 2018, State Intellectual Property Office of the P.R. China.
(Continued)

*Primary Examiner* — Tyler D Paige
(74) *Attorney, Agent, or Firm* — Victoria Friedman; Dennemeyer & Associates, LLC

(57) ABSTRACT

A method for determining the heading of an unmanned aerial vehicle and an unmanned aerial vehicle are provided. The method includes: acquiring a first heading angle of an unmanned aerial vehicle by means of a first sensing system, and acquiring a second heading angle of the unmanned aerial vehicle by means of a second sensing system (S102); judging whether the second heading angle is valid according to a comparing result (S104); and if the second heading angle is invalid, determining the first heading angle as a current heading angle of the unmanned aerial vehicle (S106).

20 Claims, 4 Drawing Sheets

(51) Int. Cl.
*B64D 7/08* (2006.01)
*G05D 1/08* (2006.01)
*G05D 1/10* (2006.01)
*B64D 47/08* (2006.01)

(56) References Cited

U.S. PATENT DOCUMENTS

| | | |
|---|---|---|
| 9,127,947 B2 * | 9/2015 | Minor .................... G01C 21/16 |
| 2004/0148917 A1 | 8/2004 | Eastwood |
| 2012/0104150 A1 | 5/2012 | Elgersma |
| 2016/0154112 A1 * | 6/2016 | Nichols ................. G01S 19/215 |
| | | 342/357.47 |
| 2017/0045892 A1 | 2/2017 | Wang |
| 2019/0187241 A1 * | 6/2019 | Jaeger ................... G01S 5/0236 |
| 2019/0204430 A1 * | 7/2019 | Schmidt .................... G01S 5/28 |
| 2019/0382141 A1 * | 12/2019 | Kerr .......................... B64F 5/60 |
| 2020/0011670 A1 * | 1/2020 | Chen ..................... B64C 39/024 |

FOREIGN PATENT DOCUMENTS

| | | | |
|---|---|---|---|
| CN | 105446355 A | 3/2016 | |
| CN | 105466423 A | 4/2016 | |
| CN | 105511484 A | 4/2016 | |
| EP | 2412220 A1 | 2/2012 | |
| JP | 2000213953 | 8/2000 | |
| JP | 2004268730 | 9/2004 | |
| JP | 200741733 | 2/2007 | |
| JP | 2007276507 | 10/2007 | |
| WO | 2016057837 A | 4/2016 | |

OTHER PUBLICATIONS

Communication Pursuant to Article 94(3) issued by the European Patent Office in connection with Application No. 18750500.3 dated May 3, 2021.

Communication Pursuant to Article 94(3) issued by the European Patent Office in connection with Application No. 18750500.3 dated Dec. 2, 2020.

Extended European Search Report issued in connection with EP 17910626 dated Nov. 23, 2020.

Notification of Reasons for Refusal issued by the Japanese Patent Office in connection with Application No. 2019-528525 dated Oct. 7, 2020.

* cited by examiner

METHOD FOR DETERMINING HEADING OF UNMANNED AERIAL VEHICLE AND UNMANNED AERIAL VEHICLE

CROSS-REFERENCE TO RELATED APPLICATIONS

This is a 35 U.S.C. 371 National Stage Patent Application of International Application No. PCT/EP2016/060017, filed May 4, 2016, which is hereby incorporated by reference in its entirety.

TECHNICAL FIELD

The embodiments of the disclosure relate to the field of unmanned aerial vehicles, and more particularly to a method for determining the heading of an unmanned aerial vehicle and an unmanned aerial vehicle.

BACKGROUND

To achieve autonomous navigation, the position and heading of an unmanned aerial vehicle must be obtained. The position of the unmanned aerial vehicle is generally obtained by a Global Positioning System (GPS), the heading of the unmanned aerial vehicle is generally obtained by combining an electronic compass and an Inertial Measurement Unit (IMU), or heading data is measured on the basis of a Real-Time Kinematic (RTK) system.

The electronic compass is prone to heading errors due to interference itself. The interference of the electronic compass is divided into two cases: one case is that the unmanned aerial vehicle suddenly enters a strong magnetic field, e.g., suddenly approaches a strong magnet, at this time, the measured heading suddenly has a great jumping change, and in this case, a wrong heading is easily detected; another case is a slow change error, for example, the unmanned aerial vehicle slowly approaches a volcano or a mine (the volcano or the mine is magnetic, there is a magnetic field, and as it is closer to a crater, the magnetic charge is stronger), in this case, it is difficult to judge based on data of the inertial navigation itself and data of the electronic compass; when using a dual-antenna RTK to measure the heading, in the presence of few satellites, the measurement accuracy is poor, the noise is large, and when positioning data cannot be transmitted to the RTK system, the heading cannot be detected.

In view of the problem in the conventional art of, when the heading angle is measured by using an electronic compass or an RTK method, wrong measured heading of an unmanned aerial vehicle caused by the influence of interference and other factors, an effective solution has not been proposed yet.

SUMMARY

The embodiments of the present invention provide a method for determining the heading of an unmanned aerial vehicle and the unmanned aerial vehicle, intended to solve the technical problem in the conventional art of, when the heading angle is measured by using an electronic compass or an RTK method, wrong measured heading of the unmanned aerial vehicle caused by the influence of interference and other factors.

According to one aspect of an embodiment of the disclosure, a method for determining the heading of an unmanned aerial vehicle is provided. The method may include that: a first heading angle of an unmanned aerial vehicle is acquired by means of a first sensing system, and a second heading angle of the unmanned aerial vehicle is acquired by means of a second sensing system; it is determined a included angle between a first heading corresponding to the first heading angle and a second heading corresponding to the second heading angle; and the included angle is compared with a preset threshold, thus the comparing result is acquired; it is judged whether the second heading angle is valid according to a comparing result; and if the second heading angle is invalid, the first heading angle is determined as the current heading angle of the unmanned aerial vehicle. According to another aspect of the embodiment of the disclosure, a storage medium is also provided. The storage medium may be characterized by including a stored program, wherein the program is run to control the storage medium to perform the method for determining the heading of an unmanned aerial vehicle.

According to another aspect of the embodiment of the disclosure, a processor is also provided. The processor may be configured to run a program, wherein the program is run to perform the method for determining the heading of an unmanned aerial vehicle.

According to another aspect of the embodiment of the disclosure, an unmanned aerial vehicle is also provided. The unmanned aerial vehicle may include a flight control center, wherein the flight control center includes a flight controller, a first sensing system, a second sensing system and a communication system; the first sensing system is configured to acquire a first heading angle of the unmanned aerial vehicle, and transmit first heading angle information to the flight controller; the second sensing system is configured to acquire a second heading angle of the unmanned aerial vehicle, and transmit second heading angle information to the flight controller; the flight controller includes a storage medium, which is configured to store a program, where the program is run to: acquire the first heading angle of the unmanned aerial vehicle by means of the first sensing system, acquire the second heading angle of the unmanned aerial vehicle by means of the second sensing system, determine a included angle between a first heading corresponding to the first heading angle and a second heading corresponding to the second heading angle, compare the included angle with a preset threshold, judge whether the second heading angle is valid according to a comparing result, judge whether the second heading angle is valid according to a comparing result, and if the second heading angle is invalid, determine the first heading angle as a current heading angle of the unmanned aerial vehicle; and the communication system is configured for communication between the flight controller, the first sensing system and the second sensing system.

In the embodiments of the present invention, a current first heading angle of an unmanned aerial vehicle is acquired by means of a first sensing system, and a current second heading angle of the unmanned aerial vehicle is acquired by means of a second sensing system; it is judged whether the second heading angle is valid according to a comparing result; and if the second heading angle is invalid, the first heading angle is determined as the current heading angle of the unmanned aerial vehicle. The purposes of detecting whether the second heading angle obtained by the second sensing system is valid and replacing the second heading angle with the first heading angle obtained by using the first sensing system when the second heading angle is invalid are achieved, thereby achieving the technical effects of guaranteeing the heading accuracy of the unmanned aerial vehicle, improving the safety and reliability of the unmanned aerial vehicle and avoiding a danger to the unmanned aerial vehicle to make the unmanned aerial vehicle safely and stably fly. Thus, the technical problem in the conventional art of, when the heading angle is measured by using an electronic compass or an RTK method, wrong measured heading of the unmanned aerial vehicle caused by the influence of interference and other factors is solved.

BRIEF DESCRIPTION OF THE DRAWINGS

The accompanying drawings described herein are used to provide a further understanding of the disclosure, and constitute a part of the present application, and the exemplary embodiments of the disclosure and the description thereof are used to explain the disclosure, but do not constitute improper limitations to the disclosure. In the drawings.

DETAILED DESCRIPTION OF THE EMBODIMENTS

Figure 1:
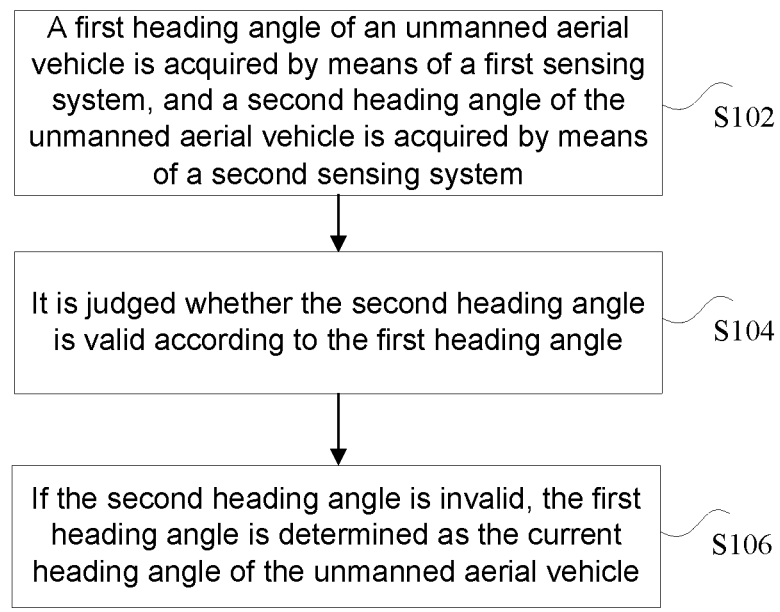
FIG. 1 is a schematic diagram of a method for determining the heading of an unmanned aerial vehicle according to an embodiment of the disclosure.

In order to make those skilled in the art better understand the solutions of the disclosure, the technical solutions in the embodiments of the disclosure will be clearly and completely described below with reference to the drawings in the embodiments of the disclosure. It is apparent that the described embodiments are only a part of the embodiments of the disclosure, not all of the embodiments. On the basis of the embodiments of the disclosure, all other embodiments obtained on the premise of no creative work of those of ordinary skill in the art should fall within the scope of protection of the disclosure.

It is to be noted that the specification and claims of the disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

Embodiment 1

According to an embodiment of the disclosure, a method embodiment of a method for determining the heading of an unmanned aerial vehicle is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

FIG. 1 is a schematic diagram of a method for determining the heading of an unmanned aerial vehicle according to an embodiment of the disclosure. As shown in FIG. 1, the method includes the steps as follows.

At step S102, a first heading angle of an unmanned aerial vehicle is acquired by means of a first sensing system, and a second heading angle of the unmanned aerial vehicle is acquired by means of a second sensing system.

At step S104, it is judged whether the second heading angle is valid according to a comparing result.

Wherein before step S104, it is determined a included angle between a first heading corresponding to the first heading angle and a second heading corresponding to the second heading angle; and the included angle is compared with a preset threshold, thus the comparing result is acquired.

At step S106, if the second heading angle is invalid, the first heading angle is determined as the current heading angle of the unmanned aerial vehicle.

In the embodiments of the disclosure, a first heading angle of an unmanned aerial vehicle is acquired by means of a first sensing system, and a second heading angle of the unmanned aerial vehicle is acquired by means of a second sensing system; it is judged whether the second heading angle is valid according to a comparing result; and if the second heading angle is invalid, the first heading angle is determined as the current heading angle of the unmanned aerial vehicle. The purposes of detecting whether the second heading angle obtained by the second sensing system is valid and replacing the second heading angle with the first heading angle obtained by using the first sensing system when the second heading angle is invalid are achieved, thereby achieving the technical effects of guaranteeing the heading accuracy of the unmanned aerial vehicle, improving the safety and reliability of the unmanned aerial vehicle and avoiding a danger to the unmanned aerial vehicle to make the unmanned aerial vehicle safely and stably fly. Thus, the technical problem in the conventional art of, when the heading angle is measured by using an electronic compass or an RTK method, wrong measured heading of the unmanned aerial vehicle caused by the influence of interference and other factors is solved.

In an alternative embodiment, the first sensing system includes a visual positioning apparatus and a satellite positioning apparatus, and the second sensing system includes an RTK apparatus and/or an inertial measurement apparatus.

Specifically, the satellite positioning apparatus may be a GPS; the RTK apparatus may be an RTK system, where the RTK system may be a dual-antenna RTK system; the inertial measurement apparatus may be an electronic compass, an IMU, or a combination of an electronic compass and an IMU.

It is to be noted that the first sensing system is mainly configured to acquire the first heading angle of the unmanned aerial vehicle, and in the case that the first sensing system includes a visual positioning apparatus and a satellite positioning apparatus, that is, the first heading angle of the unmanned aerial vehicle is acquired by means of the visual positioning apparatus and the satellite positioning apparatus, but the disclosure does not limit the adoption of the visual positioning apparatus and the satellite positioning apparatus as a unique manner of acquiring the first heading angle of the unmanned aerial vehicle, and the first heading angle of the unmanned aerial vehicle may also be acquired by means of other apparatuses. Similarly, in addition to the RTK apparatus and/or the inertial measurement apparatus, the second heading angle of the unmanned aerial vehicle may be acquired by other apparatuses.

In an alternative embodiment, the first sensing system includes a first heading measurement apparatus and a second heading measurement apparatus, and the step of acquiring a first heading angle of an unmanned aerial vehicle by means of a first sensing system in step S102 includes the operations as follows.

At step S202, a speed of the unmanned aerial vehicle in a world coordinate system is acquired by means of the first heading measurement apparatus, and a speed of the unmanned aerial vehicle in a body coordinate system is acquired by means of the second heading measurement apparatus.

At step S204, the first heading angle is determined according to the speed in the world coordinate system and the speed in the body coordinate system.

Specifically, the first heading measurement apparatus may correspond to the satellite positioning apparatus in the previous embodiment, that is, the speed of the unmanned aerial vehicle in the world coordinate system is acquired by a satellite positioning method. The second heading measurement apparatus may correspond to the visual positioning apparatus in the previous embodiment, that is, the speed of the unmanned aerial vehicle in the body coordinate system is acquired by a visual method.

Specifically, the speed of the unmanned aerial vehicle in the world coordinate system acquired by the first heading measurement apparatus may include a northward speed and an eastward speed of the unmanned aerial vehicle in the world coordinate system. The speed of the unmanned aerial vehicle in the body coordinate system acquired by the second heading measurement apparatus may include a speed of the unmanned aerial vehicle in an x-axis direction and a speed in a y-axis direction in the body coordinate system.

In an alternative embodiment, the step of determining the first heading angle according to the speed in the world coordinate system and the speed in the body coordinate system in step S204 includes the operations as follows.

At step S302, a first trigonometric function value is determined according to the speed in the world coordinate system and the speed in the body coordinate system.

At step S304, a second trigonometric function value is determined according to the speed in the world coordinate system and the speed in the body coordinate system.

At step S306, the first heading angle is determined according to the first trigonometric function value and the second trigonometric function value.

Specifically, if the first trigonometric function value is a sine value, the second trigonometric function value is a cosine value, the speed of the unmanned aerial vehicle in the world coordinate system may include a northward speed and an eastward speed of the unmanned aerial vehicle in the world coordinate system, and the speed of the unmanned aerial vehicle in the body coordinate system may include a speed of the unmanned aerial vehicle in an x-axis direction and a speed in a y-axis direction in the body coordinate system, there is a certain relationship between the speed of the unmanned aerial vehicle in the world coordinate system, the speed of the unmanned aerial vehicle in the body coordinate system and the first heading angle, which may be expressed as the following formula (1):

$$\begin{cases} V_y = V_n * \cos\theta + V_e * \sin\theta \\ V_x = -V_n * \sin\theta + V_e * \cos\theta \end{cases}.$$

Figure 2:
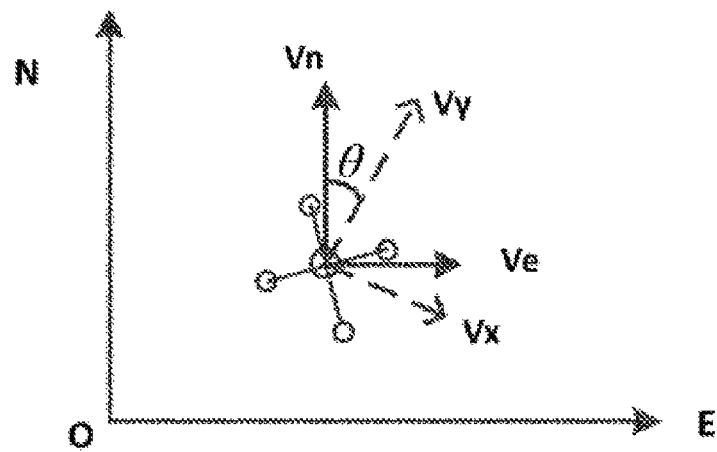
FIG. 2 is a schematic diagram of a coordinate system according to an embodiment of the disclosure.

Referring to FIG. 2, $W_{NOE}$ represents the world coordinate system, $V_n$ represents the northward speed of the unmanned aerial vehicle in the world coordinate system, $V_e$ represents the eastward speed of the unmanned aerial vehicle in the world coordinate system, $V_x$ represents the speed of the unmanned aerial vehicle in the x-axis direction in the body coordinate system, $V_y$ represents the speed of the unmanned aerial vehicle in the y-axis direction in the body coordinate system, and $\theta$ represents the first heading angle, that is, an included angle between the body direction of the unmanned aerial vehicle and the north direction, where $V_n$, $V_e$, $V_x$, and $V_y$ are known terms, and $\theta$ is an unknown term. After converting the above formula (1), the formula (2) shown below can be obtained:

$$\begin{cases} \cos\theta = \dfrac{V_n * V_y + V_e * V_x}{V_n^2 + V_e^2} \\ \sin\theta = \dfrac{V_e * V_y - V_n * V_x}{V_n^2 + V_e^2} \end{cases}.$$

In an alternative embodiment, the step of determining the first heading angle according to the first trigonometric function value and the second trigonometric function value in step S306 includes the operations as follows.

At step S402, it is judged whether the first trigonometric function value and the second trigonometric function value are valid.

At step S404, if the first trigonometric function value and the second trigonometric function value are valid, a first angle is calculated according to the first trigonometric function value, and a second angle is calculated according to the second trigonometric function value.

At step S406, a weighted average of the first angle and the second angle is calculated according to preset weights of the first angle and the second angle, and the weighted average is determined as the first heading angle.

Specifically, when the first trigonometric function value and the second trigonometric function value are valid, the first angle calculated according to the first trigonometric function value under ideal conditions and the second angle calculated according to the second trigonometric function value should be equal and can be used as the first heading angle, but since there is noise in the speed of the unmanned aerial vehicle in the world coordinate system and the speed of the unmanned aerial vehicle in the body coordinate system during actual measurement, the first angle calculated according to the first trigonometric function value is not equal to the second angle calculated according to the second trigonometric function value. When the first heading angle is obtained, in order to make the calculation result of the first heading angle more accurate, weights corresponding to the first angle and the second angle are preset in the present embodiment, and a weighted average of the first angle and the second angle is taken as the first heading angle. Here, it is to be noted that the preset weights corresponding to the first angle and the second angle may be customized according to actual conditions.

Alternatively, if the first trigonometric function value is a sine value, the second trigonometric function value is a cosine value, the speed of the unmanned aerial vehicle in the world coordinate system may include a northward speed and an eastward speed of the unmanned aerial vehicle in the world coordinate system, and the speed of the unmanned aerial vehicle in the body coordinate system may include a speed of the unmanned aerial vehicle in an x-axis direction and a speed in a y-axis direction in the body coordinate system, the above formula (2) may be further converted into the following formula (3):

$$\begin{cases} \cos\theta' = \dfrac{V_n * V_y + V_e * V_x}{V_e^2 + V_e^2} \\ \sin\theta'' = \dfrac{V_e * V_y - V_n * V_x}{V_n^2 + V_e^2} \end{cases}.$$

In the above formula (3), $\theta'$ represents the second angle, $\theta''$ represents the first angle, the corresponding $\theta'$ and $\theta''$ can be obtained by obtaining an inverse sine and an inverse cosine, and when the preset weights of the first angle and the second angle are 50%, that is, the mean value of the first angle and the second angle is determined as the first heading angle, the formula for obtaining the first heading angle $\theta$ is as follows:

$$\theta = (\arccos \theta' + \arcsin \theta'')/2.$$

In an alternative embodiment, the step of judging whether the first trigonometric function value and the second trigonometric function value are valid in step S402 includes the operations as follows.

At step S502, a first inverse trigonometric function value of the first trigonometric function value is acquired, and a second inverse trigonometric function value of the second trigonometric function value is acquired.

At step S504, a difference between the first inverse trigonometric function value and the second inverse trigonometric function value is calculated.

At step S506, it is judged whether an absolute value of the difference is smaller than a preset angle.

At step S508, if the absolute value is smaller than the preset angle, it is determined that the first trigonometric function value and the second trigonometric function value are valid.

Here, it is to be noted that the preset angle may be customized according to actual conditions.

In an alternative embodiment, the first trigonometric function value is a sine value, and the second trigonometric function value is a cosine value.

In an alternative embodiment, the step of judging whether the first trigonometric function value and the second trigonometric function value are valid in step S402 includes the operations as follows.

At step S602, it is judged whether a sum of squares of the first trigonometric function value and the second trigonometric function value is within a preset range.

At step S604, if the sum of squares is within the preset range, it is determined that the first trigonometric function value and the second trigonometric function value are valid.

Specifically, if the first trigonometric function value and the second trigonometric function value are valid, the first heading angle obtained by the first trigonometric function value and the second trigonometric function can be guaranteed to be valid, and the second heading angle is replaced if the second heading angle is invalid, thereby ensuring that the unmanned aerial vehicle can fly stably.

Specifically, if the first trigonometric function value is a sine value, the second trigonometric function value is a cosine value, the speed of the unmanned aerial vehicle in the world coordinate system may include a northward speed and an eastward speed of the unmanned aerial vehicle in the world coordinate system, and the speed of the unmanned aerial vehicle in the body coordinate system may include a speed of the unmanned aerial vehicle in an x-axis direction and a speed in a y-axis direction in the body coordinate system, a performance function formula may be preset according to the above formula (3), the performance function formula is used to judge whether the first trigonometric function value and the second trigonometric function value are valid. Alternatively, the performance function formula may be a sum of squares of the sine and cosine values, that is, the following formula:

$$f = \sin^2 \theta'' + \cos^2 \theta',$$

where $f$ represents a performance function value. Specifically, the accuracy of the first heading angle can be determined by the size of $f$. As $f$ is closer to 1, the first trigonometric function value and the second trigonometric function value are valid, and the first heading angle is more accurate. Due to the presence of speed noise, alternatively, the preset range may be set between 0.9 and 1.1. When the sum of squares of the first trigonometric function value and the second trigonometric function value is within the range, it can be considered that the first heading angle determined by the first trigonometric function value and the second trigonometric function value is accurate. Here, it is to be noted that the preset range may be customized according to actual conditions.

In an alternative embodiment, the method further includes a subsequent step as follows. At step S108, if the second heading angle is valid, a weighted average of the first heading angle and the second heading angle is calculated according to preset weights of the first heading angle and the second heading angle, and the weighted average is determined as the current heading angle of the unmanned aerial vehicle.

Specifically, when the second heading angle is valid, the first heading angle may be used as the current heading angle of the unmanned aerial vehicle, or the second heading angle may be used as the current heading angle of the unmanned aerial vehicle, but in order to improve the accuracy of the current heading angle of the unmanned aerial vehicle, the weights of the first heading angle and the second heading angle may be preset, and the weighted average of the first heading angle and the second heading angle is taken as the current heading angle of the unmanned aerial vehicle. Here, it is to be noted that the preset weights respectively corresponding to first heading angle and the second heading angle may be customized according to actual conditions.

In an alternative embodiment, the step of judging whether the second heading angle is valid according to a comparing result in step S104 includes the operations as follows.

At step S702, it is determined whether the second heading angle is wrong according to the comparing result.

At step S704, if the second heading angle is wrong, it is determined that the second heading angle is invalid.

In an alternative embodiment, the step of determining whether the second heading angle is wrong according to the comparing result in step S702 includes the operations as follows.

At step S802, it is judged whether the included angle is greater than the preset threshold.

At step S804, if the included angle between the first heading angle and the second heading angle is greater than the preset threshold, it is determined that the second heading angle is wrong.

Here, it is to be noted that the preset threshold may be customized according to actual conditions. For example, the preset threshold may be set to 5 degrees, 10 degrees, etc. If an included angle between the first heading angle and the second heading angle is greater than the preset threshold, it is indicated that the second heading angle is wrong, and the current heading of the unmanned aerial vehicle is abnormal. If the included angle between the first heading angle and the second heading angle is smaller than or equal to the preset threshold, it is indicated that the second heading angle is correct and the current heading of the unmanned aerial vehicle is normal.

In an alternative embodiment, the step of determining whether the second heading angle is wrong according to the comparing result includes the operations in step S702 as follows.

At step S902, it is judged, within a preset time period, whether the included angle continues to be greater than the preset threshold.

At step S904, if the included angle continues to be greater than the preset threshold, it is determined that the second heading angle is wrong.

Specifically, if the included angle continues to be greater than the preset threshold within a preset time period, it is indicated that the second heading angle is wrong, and the current heading of the unmanned aerial vehicle is abnormal. If the included angle continues to be smaller than or equal to the preset threshold, it is indicated that the second heading angle is correct and the current heading of the unmanned aerial vehicle is normal. Here, it is to be noted that the preset time period may be customized according to actual conditions. For example, it may be set to 2 seconds.

In an alternative embodiment, the step of acquiring a first heading angle of an unmanned aerial vehicle in step S102 includes that: at step S1002, the first heading angle of the unmanned aerial vehicle is acquired at a preset frequency.

Here, it is to be noted that the preset frequency may be customized according to actual conditions.

Figure 3:
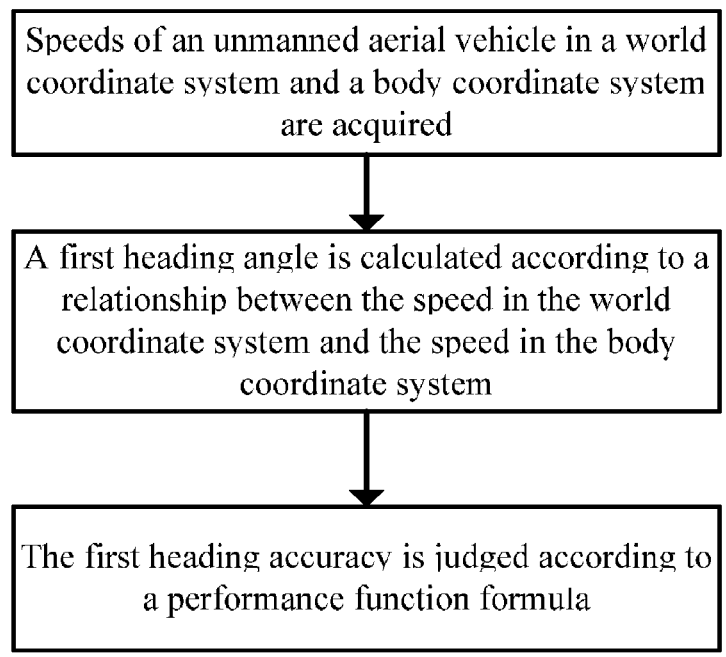
FIG. 3 is a schematic diagram of an alternative method for determining the heading of an unmanned aerial vehicle according to an embodiment of the disclosure.
Figure 4:
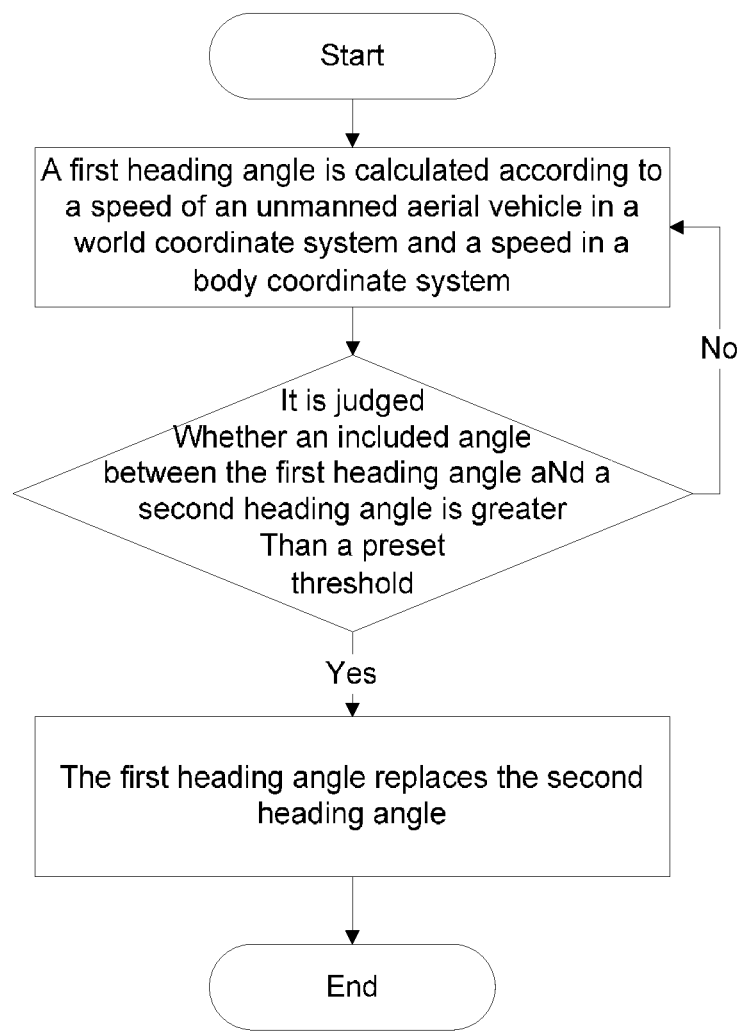
FIG. 4 is a schematic diagram of an alternative method for determining the heading of an unmanned aerial vehicle according to an embodiment of the disclosure.

In a specific embodiment, as shown in FIG. 3, the speed of the unmanned aerial vehicle in the world coordinate system may be acquired by a first heading measurement apparatus, and may specifically include northward and eastward speeds of the unmanned aerial vehicle in the world coordinate system. Then, the speed of the unmanned aerial vehicle in the body coordinate system is acquired by a second heading measurement apparatus, and may specifically include the speed of the unmanned aerial vehicle in the x-axis and y-axis directions of the body coordinate system. Then, according to a relationship between the speed of the unmanned aerial vehicle in the world coordinate system, the speed in the body coordinate system and the first heading angle, the first heading angle is determined according to the speed in the world coordinate system and the speed in the body coordinate system, and the accuracy of the first heading angle is judged according to a performance function formula. If the value obtained according to the performance function formula is between 0.9 and 1.1 at a preset time, it is indicated that the calculated first heading angle is accurate, and then as shown in FIG. 4, after the first heading angle is determined according to the speed in the world coordinate system and the speed in the body coordinate system, an included angle between the first heading angle and a second heading angle acquired by a second sensing system including an RTK apparatus and/or an inertial measurement apparatus can be calculated, and it is judged whether the included angle is greater than a certain threshold value V1, such as 5 degrees. If yes, it is indicated that the first heading angle is wrong, and the first heading angle is used instead of the second heading angle. If not, it is indicated that the current detected first heading angle is correct, the step of determining the first heading angle according to the speed in the world coordinate system and the speed in the body coordinate system can be returned, and the calculation and judgment steps for the included angle between the heading angles calculated in two manners are continued.

Embodiment 2

Figure 5:
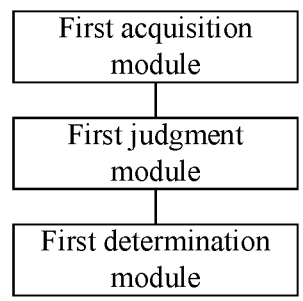
FIG. 5 is a schematic diagram of an apparatus for determining the heading of an unmanned aerial vehicle according to an embodiment of the disclosure.

According to the embodiment of the disclosure, a product embodiment of an apparatus for determining the heading of an unmanned aerial vehicle is provided. FIG. 5 is a schematic diagram of an apparatus for determining the heading of an unmanned aerial vehicle according to an embodiment of the disclosure. As shown in FIG. 5, the apparatus includes a first acquisition module, a first judgment module and a first determination module, wherein the first acquisition module is configured to acquire a first heading angle of an unmanned aerial vehicle by means of a first sensing system, and acquire a second heading angle of the unmanned aerial vehicle by means of a second sensing system; the first judgment module is configured to judge whether the second heading angle is valid according to a comparing result; and the first determination module is configured to determine, if the second heading angle is invalid, the first heading angle as a current heading angle of the unmanned aerial vehicle.

In the embodiment of the disclosure, the first acquisition module acquires a first heading angle of an unmanned aerial vehicle by means of a first sensing system, and acquires a second heading angle of the unmanned aerial vehicle by means of a second sensing system; the first judgment module judges whether the second heading angle is valid according to a comparing result; and if the second heading angle is invalid, the first determination module determines the first heading angle as a current heading angle of the unmanned aerial vehicle. The purposes of detecting whether the second heading angle obtained by the second sensing system is valid and replacing the second heading angle with the first heading angle obtained by using the first sensing system when the second heading angle is invalid are achieved, thereby achieving the technical effects of guaranteeing the heading accuracy of the unmanned aerial vehicle, improving the safety and reliability of the unmanned aerial vehicle and avoiding a danger to the unmanned aerial vehicle to make the unmanned aerial vehicle safely and stably fly. Thus, the technical problem in the conventional art of, when the heading angle is measured by using an electronic compass or an RTK method, wrong measured heading of the unmanned aerial vehicle caused by the influence of interference and other factors is solved.

Here, it is to be noted that the first acquisition module, the first judgment module and the first determination module may be run in a computer terminal as part of the apparatus, and the functions implemented by the modules may be executed by a processor in the computer terminal, where the computer terminal may also be a terminal device such as a smart phone (e.g., an Android phone, an iOS phone, etc.), a tablet computer, a palm computer, a Mobile Internet device (MID), and a PAD.

In an alternative embodiment, the first sensing system includes a visual positioning apparatus and a satellite positioning apparatus, and the second sensing system includes an RTK apparatus and/or an inertial measurement apparatus.

In an alternative embodiment, the first sensing system includes a first heading measurement apparatus and a second heading measurement apparatus. The first acquisition module includes: a second acquisition module, configured to acquire a speed of the unmanned aerial vehicle in a world coordinate system by means of the first heading measurement apparatus, and acquire a speed of the unmanned aerial vehicle in a body coordinate system by means of the second heading measurement apparatus; and a second determination module, configured to determine the first heading angle according to the speed in the world coordinate system and the speed in the body coordinate system.

Here, it is to be noted that the second acquisition module and the second determination module may be run in a computer terminal as part of the apparatus, and the functions implemented by the modules may be executed by a processor in the computer terminal, where the computer terminal may also be a terminal device such as a smart phone (e.g., an Android phone, an iOS phone, etc.), a tablet computer, a palm computer, an MID, and a PAD.

In an alternative embodiment, the second determination module includes: a third determination module, configured to determine a first trigonometric function value according to the speed in the world coordinate system and the speed in the body coordinate system; a fourth determination module, configured to determine a second trigonometric function value according to the speed in the world coordinate system and the speed in the body coordinate system; and a fifth determination module, configured to determine the first heading angle according to the first trigonometric function value and the second trigonometric function value.

Here, it is to be noted that the third determination module, the fourth determination module and the fifth determination module may be run in a computer terminal as part of the apparatus, and the functions implemented by the modules may be executed by a processor in the computer terminal, where the computer terminal may also be a terminal device such as a smart phone (e.g., an Android phone, an iOS phone, etc.), a tablet computer, a palm computer, an MID, and a PAD.

In an alternative embodiment, the fifth determination module includes: a second judgment module, configured to judge whether the first trigonometric function value and the second trigonometric function value are valid; a first calculation module, configured to calculate, if the first trigonometric function value and the second trigonometric function value are valid, a first angle according to the first trigonometric function value, and calculate a second angle according to the second trigonometric function value; and a sixth determination module, configured to calculate a weighted average of the first angle and the second angle according to preset weights of the first angle and the second angle, and determine the weighted average as the first heading angle.

Here, it is to be noted that the second judgment module, the first calculation module and the sixth determination module may be run in a computer terminal as part of the apparatus, and the functions implemented by the modules may be executed by a processor in the computer terminal, where the computer terminal may also be a terminal device such as a smart phone (e.g., an Android phone, an iOS phone, etc.), a tablet computer, a palm computer, an MID, and a PAD.

In an alternative embodiment, the second judgment module includes: a third acquisition module, configured to acquire a first inverse trigonometric function value of the first trigonometric function value, and acquire a second inverse trigonometric function value of the second trigonometric function value; a second calculation module, configured to calculate a difference between the first inverse trigonometric function value and the second inverse trigonometric function value; a third judgment module, configured to judge whether an absolute value of the difference is smaller than a preset angle; and a seventh determination module, configured to determine, if the absolute value is smaller than the preset angle, that the first trigonometric function value and the second trigonometric function value are valid.

Here, it is to be noted that the third acquisition module, the second calculation module, the third judgment module and the seventh determination module may be run in a computer terminal as part of the apparatus, and the functions implemented by the modules may be executed by a processor in the computer terminal, where the computer terminal may also be a terminal device such as a smart phone (e.g., an Android phone, an iOS phone, etc.), a tablet computer, a palm computer, a Mobile Internet device (MID), and a PAD.

In an alternative embodiment, the first trigonometric function value is a sine value, and the second trigonometric function value is a cosine value.

In an alternative embodiment, the second judgment module includes: a fourth judgment module, configured to judge whether a sum of squares of the first trigonometric function value and the second trigonometric function value is within a preset range; and an eighth determination module, configured to determine, if the sum of squares is within the preset range, that the first trigonometric function value and the second trigonometric function value are valid.

Here, it is to be noted that the fourth judgment module and the eighth determination module may be run in a computer terminal as part of the apparatus, and the functions implemented by the modules may be executed by a processor in the computer terminal, where the computer terminal may also be a terminal device such as a smart phone (e.g., an Android phone, an iOS phone, etc.), a tablet computer, a palm computer, an MID, and a PAD.

In an alternative embodiment, the preset range is 0.9 to 1.1.

In an alternative embodiment, the determination apparatus further includes a ninth determination module, configured to calculate, if the second heading angle is valid, a weighted average of the first heading angle and the second heading angle according to preset weights of the first heading angle and the second heading angle, and determine the weighted average as the current heading angle of the unmanned aerial vehicle.

Here, it is to be noted that the ninth determination module may be run in a computer terminal as part of the apparatus, and the functions implemented by the modules may be executed by a processor in the computer terminal, where the computer terminal may also be a terminal device such as a smart phone (e.g., an Android phone, an iOS phone, etc.), a tablet computer, a palm computer, an MID, and a PAD.

In an alternative embodiment, the first judgment module includes: a tenth determination module, configured to determine whether the second heading angle is wrong according to the comparing result; and an eleventh determination module, configured to determine, if the second heading angle is wrong, that the second heading angle is invalid.

Here, it is to be noted that the tenth determination module and the eleventh determination module may be run in a computer terminal as part of the apparatus, and the functions implemented by the modules may be executed by a processor in the computer terminal, where the computer terminal may also be a terminal device such as a smart phone (e.g., an Android phone, an iOS phone, etc.), a tablet computer, a palm computer, an MID, and a PAD.

In an alternative embodiment, the eleventh determination module includes: a fifth judgment module, configured to judge whether an included angle between the first heading angle and the second heading angle is greater than the preset threshold; and a twelfth determination module, configured to determine, if the included angle between the first heading angle and the second heading angle is greater than the preset threshold, that the second heading angle is wrong.

Here, it is to be noted that the fifth judgment module and the twelfth determination module may be run in a computer terminal as part of the apparatus, and the functions implemented by the modules may be executed by a processor in the computer terminal, where the computer terminal may also be a terminal device such as a smart phone (e.g., an Android phone, an iOS phone, etc.), a tablet computer, a palm computer, an MID, and a PAD.

In an alternative embodiment, the eleventh determination module includes: a sixth judgment module, configured to judge, within a preset time period, whether the included angle continues to be greater than the preset threshold; and a thirteenth determination module, configured to determine, if the included angle continues to be greater than the preset threshold, that the second heading angle is wrong.

Here, it is to be noted that the sixth judgment module and the thirteenth determination module may be run in a computer terminal as part of the apparatus, and the functions implemented by the modules may be executed by a processor in the computer terminal, where the computer terminal may also be a terminal device such as a smart phone (e.g., an Android phone, an iOS phone, etc.), a tablet computer, a palm computer, an MID, and a PAD.

In an alternative embodiment, the first acquisition module includes: a fourth acquisition module, configured to acquire the first heading angle of the unmanned aerial vehicle at a preset frequency.

Here, it is to be noted that the fourth determination module may be run in a computer terminal as part of the apparatus, and the functions implemented by the modules may be executed by a processor in the computer terminal, where the computer terminal may also be a terminal device such as a smart phone (e.g., an Android phone, an iOS phone, etc.), a tablet computer, a palm computer, an MID, and a PAD.

Embodiment 3

According to the embodiment of the disclosure, a product embodiment of a storage medium is provided. The storage medium includes a stored program, wherein the program is run to control the storage medium to perform the method for determining the heading of an unmanned aerial vehicle.

Embodiment 4

According to the embodiment of the disclosure, a product embodiment of a processor is provided. The processor is configured to run a program, wherein the program is run to perform the method for determining the heading of an unmanned aerial vehicle.

Embodiment 5

According to the embodiment of the disclosure, a product embodiment of a terminal is provided. The terminal includes a first acquisition module, a first judgment module, a first determination module and a processor, wherein the first acquisition module is configured to acquire a first heading angle of an unmanned aerial vehicle by means of a first sensing system, and acquire a second heading angle of the unmanned aerial vehicle by means of a second sensing system; the first judgment module is configured to judge whether the second heading angle is valid according to a comparing result; the first determination module is configured to determine, if the second heading angle is invalid, the first heading angle as a current heading angle of the unmanned aerial vehicle; and the processor runs a program, where the program is run to perform the method for determining the heading of an unmanned aerial vehicle for data output from the first acquisition module, the first judgment module and the first determination module.

Embodiment 6

According to the embodiment of the disclosure, a product embodiment of a terminal is provided. The terminal includes a first acquisition module, a first judgment module, a first determination module and a storage medium, wherein the first acquisition module is configured to acquire a first heading angle of an unmanned aerial vehicle by means of a first sensing system, and acquire a second heading angle of the unmanned aerial vehicle by means of a second sensing system; the first judgment module is configured to judge whether the second heading angle is valid according to a comparing result; the first determination module is configured to determine, if the second heading angle is invalid, the first heading angle as a current heading angle of the unmanned aerial vehicle; and the storage medium is configured to store a program, where the program is run to perform the method for determining the heading of an unmanned aerial vehicle for data output from the first acquisition module, the first judgment module and the first determination module.

Embodiment 7

Figure 6:
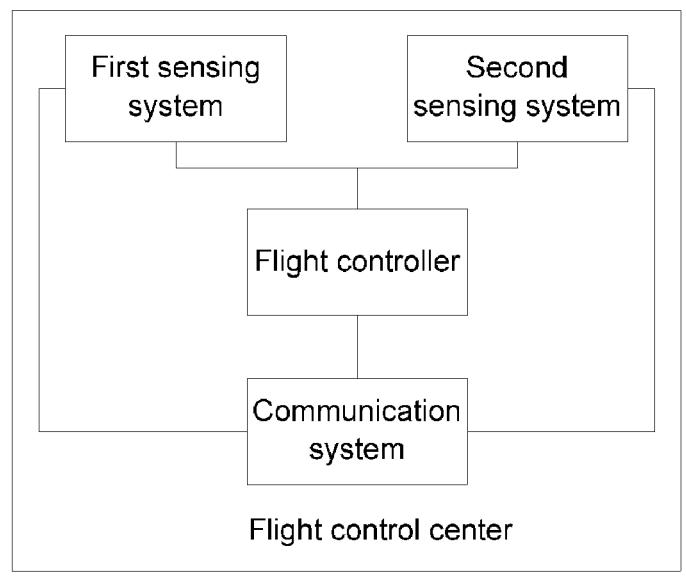
FIG. 6 is a schematic diagram of an unmanned aerial vehicle according to an embodiment of the disclosure.

According to the embodiment of the disclosure, a product embodiment of an unmanned aerial vehicle is provided. FIG. 6 illustrates an unmanned aerial vehicle according to an embodiment of the disclosure. As shown in FIG. 6, the unmanned aerial vehicle includes a flight control center, wherein the flight control center includes a flight controller, a first sensing system, a second sensing system and a communication system; the first sensing system is configured to acquire a first heading angle of the unmanned aerial vehicle, and transmit first heading angle information to the flight controller; the second sensing system is configured to acquire a second heading angle of the unmanned aerial vehicle, and transmit second heading angle information to the flight controller; the flight controller includes a storage medium, which is configured to store a program, where the program is run to: acquire the first heading angle of the unmanned aerial vehicle by means of the first sensing system, acquire the second heading angle of the unmanned aerial vehicle by means of the second sensing system, determine a included angle between a first heading corresponding to the first heading angle and a second heading corresponding to the second heading angle, compare the included angle with a preset threshold, judge whether the second heading angle is valid according to a comparing result, and if the second heading angle is invalid, determine the first heading angle as a current heading angle of the unmanned aerial vehicle; and the communication system is configured for communication between the flight controller, the first sensing system and the second sensing system.

In an alternative embodiment, the first sensing system includes a visual positioning apparatus and a satellite positioning apparatus, and the second sensing system includes an RTK apparatus and/or an inertial measurement apparatus.

In an alternative embodiment, the first sensing system includes a first heading measurement apparatus and a second heading measurement apparatus. The first heading measurement apparatus is configured to acquire a speed of the unmanned aerial vehicle in a world coordinate system; the second heading measurement apparatus is configured to acquire a speed of the unmanned aerial vehicle in a body coordinate system; and the flight controller is configured to acquire, when acquiring the first heading angle of the unmanned aerial vehicle by means of the first sensing system, the speed of the unmanned aerial vehicle in the world coordinate system by means of the first heading measurement apparatus, acquire the speed of the unmanned aerial vehicle in the body coordinate system by means of the second heading measurement apparatus, and determine the first heading angle according to the speed in the world coordinate system and the speed in the body coordinate system.

In an alternative embodiment, the flight controller is configured to determine, when determining the first heading angle according to the speed in the world coordinate system and the speed in the body coordinate system, a first trigonometric function value according to the speed in the world coordinate system and the speed in the body coordinate system, determine a second trigonometric function value according to the speed in the world coordinate system and the speed in the body coordinate system, and determine the first heading angle according to the first trigonometric function value and the second trigonometric function value.

In an alternative embodiment, the flight controller is configured to judge, when determining the first heading angle according to the first trigonometric function value and the second trigonometric function value, whether the first trigonometric function value and the second trigonometric function value are valid, calculate, if the first trigonometric function value and the second trigonometric function value are valid, a first angle according to the first trigonometric function value, calculate a second angle according to the second trigonometric function value, calculate a weighted average of the first angle and the second angle according to preset weights of the first angle and the second angle, and determine the weighted average as the first heading angle.

In an alternative embodiment, the flight controller is configured to acquire, when judging whether the first trigonometric function value and the second trigonometric function value are valid, a first inverse trigonometric function value of the first trigonometric function value, acquire a second inverse trigonometric function value of the second trigonometric function value, calculate a difference between the first inverse trigonometric function value and the second inverse trigonometric function value, judge whether an absolute value of the difference is smaller than a preset angle, and determine, if the absolute value is smaller than the preset angle, that the first trigonometric function value and the second trigonometric function value are valid.

In an alternative embodiment, the first trigonometric function value is a sine value, and the second trigonometric function value is a cosine value.

In an alternative embodiment, the flight controller is configured to judge, when judging whether the first trigonometric function value and the second trigonometric function value are valid, whether a sum of squares of the first trigonometric function value and the second trigonometric function value is within a preset range, and determine, if the sum of squares is within the preset range, that the first trigonometric function value and the second trigonometric function value are valid.

In an alternative embodiment, the preset range is 0.9 to 1.1.

In an alternative embodiment, the flight controller is further configured to calculate, if the second heading angle is valid, a weighted average of the first heading angle and the second heading angle according to preset weights of the first heading angle and the second heading angle, and determine the weighted average as the current heading angle of the unmanned aerial vehicle.

In an alternative embodiment, the flight controller is configured to determine, when judging whether the second heading angle is valid according to a comparing result, whether the second heading angle is wrong according to the comparing result, and determine, if the second heading angle is wrong, that the second heading angle is invalid.

In an alternative embodiment, the flight controller is configured to judge, when determining whether the second heading angle is wrong according to the comparing result, whether the included angle is greater than the preset threshold, and determine, if the included angle between the first heading angle and the second heading angle is greater than the preset threshold, that the second heading angle is wrong.

In an alternative embodiment, the flight controller is configured to judge, when determining whether the second heading angle is wrong according to the comparing result, whether the included angle continues to be greater than a preset threshold within a preset time period, and determine, if the included angle continues to be greater than the preset threshold, that the second heading angle is wrong.

In an alternative embodiment, the first sensing system is configured to acquire, when acquiring a first heading angle of an unmanned aerial vehicle, the first heading angle of the unmanned aerial vehicle at a preset frequency.

The various functional units provided by the embodiments of the present application may be run in a mobile terminal, a computer terminal, or a similar calculation apparatus, or may be stored as part of a storage medium.

Thus, the embodiments of the disclosure may provide a computer terminal, which may be any computer terminal device in a computer terminal group. Alternatively, in the present embodiment, the above computer terminal may also be replaced with a terminal device such as a mobile terminal.

Alternatively, in the present embodiment, the above computer terminal may be located in at least one of multiple network devices of a computer network.

In the present embodiment, the above computer terminal may perform a program code of the following steps in the method for determining the heading of an unmanned aerial vehicle: a first heading angle of an unmanned aerial vehicle is acquired by means of a first sensing system, and a second heading angle of the unmanned aerial vehicle is acquired by means of a second sensing system; it is judged whether the second heading angle is valid according to a comparing result; and if the second heading angle is invalid, the first heading angle is determined as the current heading angle of the unmanned aerial vehicle.

Alternatively, the computer terminal may include: one or more processors, a memory and a transmission apparatus.

The memory may be configured to store a software program and module, such as a program instruction/module corresponding to the method and apparatus for determining the heading of an unmanned aerial vehicle in the embodiments of the disclosure. The processor executes various functional applications and data processing, that is, implements the above method for determining the heading of an unmanned aerial vehicle by running the software program and module stored in the memory. The memory may include a high speed random access memory and may also include a non-volatile memory such as one or more magnetic storage apparatuses, a flash memory, or other non-volatile solid state memories. In some examples, the memory may further include memories remotely located relative to the processor, which may be connected to the terminal over a network. The examples of such networks include, but are not limited to, the Internet, the Intranet, local area networks, mobile communication networks, and combinations thereof.

The transmission apparatus is configured to receive or send data over a network. The above specific network examples may include a wired network and a wireless network. In one example, the transmission apparatus includes a Network Interface Controller (NIC) that can be connected to other network devices and routers through a network cable to communicate with the Internet or local area network. In one example, the transmission apparatus is a Radio Frequency (RF) module for communicating with the Internet wirelessly.

Specifically, the memory is configured to store information of preset action conditions and preset permitted users, and applications.

The processor may call the information and applications stored in the memory by the transmission apparatus to execute the program code of the method steps of each of the alternative or preferred embodiments in the above method embodiments.

Those of ordinary skill in the art may understand that the computer terminal may also be a terminal device such as a smart phone (e.g., an Android phone, an iOS phone, etc.), a tablet computer, a palm computer, an MID, and a PAD.

Those of ordinary skill in the art may understand that all or part of the steps of the above embodiments may be completed by a program to instruct terminal device related hardware, the program may be stored in a computer readable storage medium, and the storage medium may include: a flash disk, a ROM, a RAM, a magnetic disk or an optical disc.

The embodiment of the disclosure also provides a storage medium. Alternatively, in the present embodiment, the above storage medium may be configured to store the program code performed by the method for determining the heading of an unmanned aerial vehicle provided in the above method embodiments and apparatus embodiments.

Alternatively, in the present embodiment, the above storage medium may be located in any one of computer terminals in a computer terminal group in a computer network, or in any one of mobile terminals in a mobile terminal group.

Alternatively, in the present embodiment, the storage medium is configured to store a program code for performing the following steps: a first heading angle of an unmanned aerial vehicle is acquired by means of a first sensing system, and a second heading angle of the unmanned aerial vehicle is acquired by means of a second sensing system; it is judged whether the second heading angle is valid according to a comparing result; and if the second heading angle is invalid, the first heading angle is determined as the current heading angle of the unmanned aerial vehicle.

Alternatively, in the present embodiment, the storage medium may also be configured to store program codes for various preferred or alternative method steps provided by the method for determining the heading of an unmanned aerial vehicle.

The method and apparatus for determining the heading of an unmanned aerial vehicle according to the disclosure are described above by way of example with reference to the accompanying drawings. However, those skilled in the art should understand that various improvements can be made to the method and apparatus for determining the heading of an unmanned aerial vehicle described above according to the disclosure without departing from the scope of the disclosure. Therefore, the scope of protection of the disclosure should be determined by the content of the appended claims.

The apparatus for determining the heading of an unmanned aerial vehicle includes a processor and a memory. The first acquisition unit, the first judgment module, the first determination module and the like are stored in the memory by serving as program units, and the processor executes the above program units stored in the memory.

The processor includes a kernel, which calls a corresponding program unit from the memory. There may be one or more kernels, and it is possible to aggregate access paths of any length by adjusting the kernel parameters.

The memory may include a volatile memory, a RAM and/or a non-volatile memory in a computer-readable medium such as a ROM or a flash RAM, the memory including at least one storage chip.

The present application also provides an embodiment of a computer program product, when executed on a data processing device, adapted to perform initialization of a program code having the following method steps: a first heading angle of an unmanned aerial vehicle is acquired by means of a first sensing system, and a second heading angle of the unmanned aerial vehicle is acquired by means of a second sensing system; it is judged whether the second heading angle is valid according to a comparing result; and if the second heading angle is invalid, the first heading angle is determined as the current heading angle of the unmanned aerial vehicle.

The serial numbers of the embodiments of the disclosure are merely for the description, and do not represent the advantages and disadvantages of the embodiments.

In the above embodiments of the disclosure, descriptions of each embodiment are emphasized respectively, and parts which are not elaborated in detail in a certain embodiment may refer to relevant descriptions of other embodiments.

In several embodiments provided by the present application, it is to be understood that the disclosed technical content may be implemented in other manners. The apparatus embodiments described above are merely illustrative. For example, the division of the unit may be a logical function division. In actual implementation, there may be another division manner, for example, multiple units or components may be combined or integrated into another system, or some features may be ignored or not executed. In addition, coupling or direct coupling or communication connection displayed or discussed may be indirect coupling or communication connection between units or modules through some interfaces, and may be electrical or otherwise.

The units described as separate components may or may not be physically separated, and the components displayed as units may or may not be physical units, that is, may be located in one place, or may be distributed to multiple units. Some or all of the units may be selected according to actual needs to achieve the purpose of the solution of the present embodiment.

In addition, each functional unit in each embodiment of the disclosure may be all integrated into one processing unit, or each unit may exist physically separately, or two or more units may be integrated into one unit. The integrated unit may be implemented in the form of hardware or in the form of hardware and software functional units.

The integrated unit may be stored in a computer-readable storage medium if being implemented in the form of a software function unit and sold or used as a standalone product. Based on such understanding, the technical solution of the disclosure, which is essential or contributes to the conventional art, or all or part of the technical solution, may be embodied in the form of a software product stored in a storage medium, including a plurality of instructions used to cause a computer device (which may be a personal computer, a server, or a network device, etc.) to perform all or part of the steps of the method described in various embodiments of the disclosure. The foregoing storage medium includes: various media capable of storing a program code such as a U disk, a ROM, a RAM, a mobile hard disk, a magnetic disk or an optical disc.

The above is only preferred implementations of the disclosure. It is to be noted that a number of modifications and refinements may be made by those of ordinary skill in the art without departing from the principles of the disclosure, and such modifications and refinements are also considered to be within the scope of protection of the disclosure.

What is claimed is:

1. A method for determining the heading of an unmanned aerial vehicle, comprising the following steps:
    acquiring, by a flight control center of the unmanned aerial vehicle, a first heading angle of an unmanned aerial vehicle by means of a first sensing system, and acquiring a second heading angle of the unmanned aerial vehicle by means of a second sensing system;
    determining, by the flight control center of the unmanned aerial vehicle, an included angle between a first heading corresponding to the first heading angle and a second heading corresponding to the second heading angle;
    comparing, by a flight control center of the unmanned aerial vehicle, the included angle with a preset threshold;
    judging, by a flight control center of the unmanned aerial vehicle, whether the second heading angle is valid according to a comparing result; and
    in the case that the second heading angle is invalid, determining, by a flight control center of the unmanned aerial vehicle, the first heading angle as a current heading angle of the unmanned aerial vehicle, wherein the current heading angle of the unmanned aerial vehicle is used for autonomous navigation in a flying process.

2. The determination method as claimed in claim 1, wherein
    the first sensing system comprises a visual positioning apparatus and a satellite positioning apparatus; and
    the second sensing system comprises a Real-Time Kinematic (RTK) apparatus and/or an inertial measurement apparatus.

3. The method as claimed in claim 1, wherein the first sensing system comprises a first heading measurement apparatus and a second heading measurement apparatus, and the step of acquiring the first heading angle of an unmanned aerial vehicle by means of a first sensing system comprises:
    acquiring a speed of the unmanned aerial vehicle in a world coordinate system by means of the first heading measurement apparatus, and acquiring a speed of the unmanned aerial vehicle in a body coordinate system by means of the second heading measurement apparatus; and
    determining the first heading angle according to the speed in the world coordinate system and the speed in the body coordinate system.

4. The method as claimed in claim 3, wherein the step of determining the first heading angle according to the speed in the world coordinate system and the speed in the body coordinate system comprises:
    determining a first trigonometric function value according to the speed in the world coordinate system and the speed in the body coordinate system;
    determining a second trigonometric function value according to the speed in the world coordinate system and the speed in the body coordinate system; and
    determining the first heading angle according to the first trigonometric function value and the second trigonometric function value.

5. The method as claimed in claim 4, wherein the step of determining the first heading angle according to the first trigonometric function value and the second trigonometric function value comprises:
    judging whether the first trigonometric function value and the second trigonometric function value are valid;
    in a case that the first trigonometric function value and the second trigonometric function value are valid, calculating a first angle according to the first trigonometric function value, and calculating a second angle according to the second trigonometric function value; and
    calculating a weighted average of the first angle and the second angle according to preset weights of the first angle and the second angle, and determining the weighted average as the first heading angle.

6. The method as claimed in claim 5, wherein the step of judging whether the first trigonometric function value and the second trigonometric function value are valid comprises:
    acquiring a first inverse trigonometric function value of the first trigonometric function value, and acquiring a second inverse trigonometric function value of the second trigonometric function value;
    calculating a difference between the first inverse trigonometric function value and the second inverse trigonometric function value;
    judging whether an absolute value of the difference is smaller than a preset angle; and
    in a case that the absolute value is smaller than the preset angle, determining that the first trigonometric function value and the second trigonometric function value are valid.

7. The determination method as claimed in claim 4, wherein the first trigonometric function value is a sine value, and the second trigonometric function value is a cosine value.

8. The method as claimed in claim 5, wherein the step of judging whether the first trigonometric function value and the second trigonometric function value are valid comprises:

judging whether a sum of squares of the first trigonometric function value and the second trigonometric function value is within a preset range; and in a case that the sum of squares is within the preset range, determining that the first trigonometric function value and the second trigonometric function value are valid.

9. The determination method as claimed in claim 8, wherein the preset range is 0.9 to 1.1.

10. The method as claimed in claim 1, further comprising the following subsequent steps:

in a case that the second heading angle is valid, calculating a weighted average of the first heading angle and the second heading angle according to preset weights of the first heading angle and the second heading angle, and determining the weighted average as the current heading angle of the unmanned aerial vehicle.

11. The method as claimed in claim 1, wherein the step of judging whether the second heading angle is valid according to a comparing result comprises:

determining whether the second heading angle is wrong according to the comparing result; and in a case that the second heading angle is wrong, determining that the second heading angle is invalid.

12. The method as claimed in claim 11, wherein the step of determining whether the second heading angle is wrong according to the comparing result comprises:

judging whether the included angle is greater than the preset threshold; and in the case that the included angle between the first heading angle and the second heading angle is greater than the preset threshold, determining that the second heading angle is wrong.

13. The method as claimed in claim 12, wherein the step of determining whether the second heading angle is wrong according to the comparing result comprises:

judging, within a preset time period, whether the included angle continues to be greater than the preset threshold; and in a case that the included angle continues to be greater than the preset threshold, determining that the second heading angle is wrong.

14. The determination method as claimed in claim 1, wherein the step of acquiring a current first heading angle of an unmanned aerial vehicle comprises:

acquiring the current first heading angle of the unmanned aerial vehicle at a preset frequency.

15. An unmanned aerial vehicle, comprising a flight control center, the flight control center comprising a flight controller, a first sensing system, a second sensing system and a communication system, wherein the first sensing system is configured to acquire a first heading angle of the unmanned aerial vehicle, and transmit first heading angle information to the flight controller;

the second sensing system is configured to acquire a second heading angle of the unmanned aerial vehicle, and transmit second heading angle information to the flight controller;

the flight controller comprises a storage medium, which is configured to store a program, where the program is run to: acquire the first heading angle of the unmanned aerial vehicle by means of the first sensing system, acquire the second heading angle of the unmanned aerial vehicle by means of the second sensing system, determine a included angle between a first heading corresponding to the first heading angle and a second heading corresponding to the second heading angle, compare the included angle with a preset threshold, judge whether the second heading angle is valid according to a comparing result, and in a case that the second heading angle is invalid, determine the first heading angle as a current heading angle of the unmanned aerial vehicle, wherein the current heading angle of the unmanned aerial vehicle is used for autonomous navigation in a flying process; and the communication system is configured for communication between the flight controller, the first sensing system and the second sensing system.

16. The unmanned aerial vehicle as claimed in claim 15, wherein the first sensing system comprises a first heading measurement apparatus and a second heading measurement apparatus;

the first heading measurement apparatus is configured to acquire a speed of the unmanned aerial vehicle in a world coordinate system;

the second heading measurement apparatus is configured to acquire a speed of the unmanned aerial vehicle in a body coordinate system; and the flight controller is configured to acquire, when acquiring the first heading angle of the unmanned aerial vehicle by means of the first sensing system, the speed of the unmanned aerial vehicle in the world coordinate system by means of the first heading measurement apparatus, acquire the speed of the unmanned aerial vehicle in the body coordinate system by means of the second heading measurement apparatus, and determine the first heading angle according to the speed in the world coordinate system and the speed in the body coordinate system.

17. The unmanned aerial vehicle as claimed in claim 16, wherein the flight controller is configured to determine, when determining the first heading angle according to the speed in the world coordinate system and the speed in the body coordinate system, a first trigonometric function value according to the speed in the world coordinate system and the speed in the body coordinate system, determine a second trigonometric function value according to the speed in the world coordinate system and the speed in the body coordinate system, and determine the first heading angle according to the first trigonometric function value and the second trigonometric function value.

18. The unmanned aerial vehicle as claimed in claim 17, wherein the flight controller is configured to judge, when determining the first heading angle according to the first trigonometric function value and the second trigonometric function value, whether the first trigonometric function value and the second trigonometric function value are valid, calculate, in a case that the first trigonometric function value and the second trigonometric function value are valid, a first angle according to the first trigonometric function value, calculate a second angle according to the second trigonometric function value, calculate a weighted average of the first angle and the second angle according to preset weights of the first angle and the second angle, and determine the weighted average as the first heading angle;

Wherein the flight controller is configured to acquire, when judging whether the first trigonometric function value and the second trigonometric function value are valid, a first inverse trigonometric function value of the first trigonometric function value, acquire a second inverse trigonometric function value of the second trigonometric function value, calculate a difference between the first inverse trigonometric function value and the second inverse trigonometric function value, judge whether an absolute value of the difference is smaller than a preset angle, and determine, in a case that the absolute value is smaller than the preset angle, that the first trigonometric function value and the second trigonometric function value are valid.

19. The unmanned aerial vehicle as claimed in claim 18, wherein the flight controller is configured to judge, when judging whether the first trigonometric function value and the second trigonometric function value are valid, whether a sum of squares of the first trigonometric function value and the second trigonometric function value is within a preset range, and determine, in a case that the sum of squares is within the preset range, that the first trigonometric function value and the second trigonometric function value are valid.

20. The unmanned aerial vehicle as claimed in claim 15, wherein the flight controller is configured to determine, when judging whether the second heading angle is valid according to a comparing result, whether the second heading angle is wrong according to the comparing result, and determine, in a case that the second heading angle is wrong, that the second heading angle is invalid;

wherein the flight controller is configured to judge, when determining whether the second heading angle is wrong according to the comparing result, whether the included angle is greater than the preset threshold, and determine, in a case that the included angle between the first heading angle and the second heading angle is greater than the preset threshold, that the second heading angle is wrong.

* * * * *